No. 865,160. PATENTED SEPT. 3, 1907.
J. K. CLARK.
STEAM TURBINE.
APPLICATION FILED JAN. 29, 1907.

2 SHEETS—SHEET 1.

WITNESSES
H. S. Dietrich

INVENTOR
Joseph K. Clark
BY Munn & Co
ATTORNEYS

No. 865,160. PATENTED SEPT. 3, 1907.
J. K. CLARK.
STEAM TURBINE.
APPLICATION FILED JAN. 29, 1907.
2 SHEETS—SHEET 2.
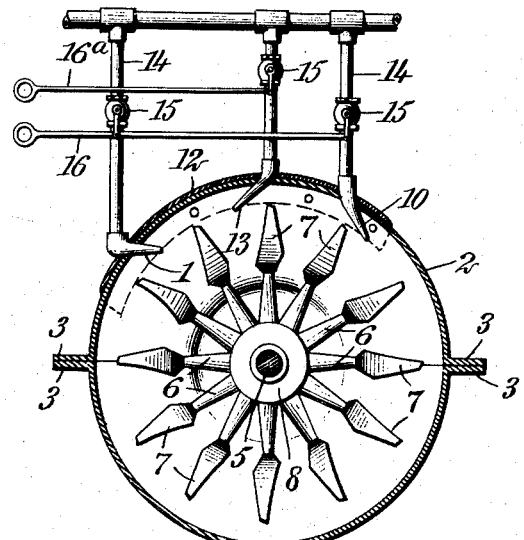
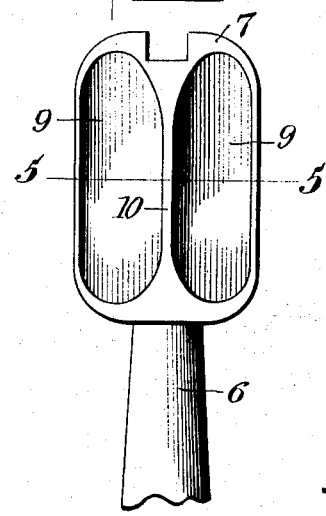
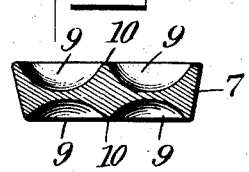
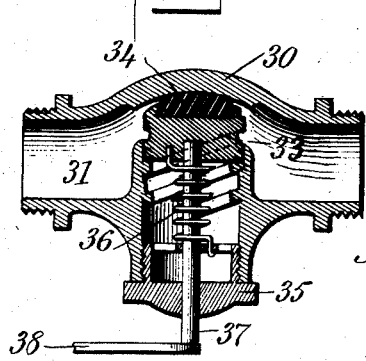
WITNESSES
H. T. Dieterich
INVENTOR
Joseph K. Clark
BY Munn & Co
ATTORNEYS

UNITED STATES PATENT OFFICE.

JOSEPH KEALAKAIMANA CLARK, OF HONOLULU, TERRITORY OF HAWAII.

STEAM-TURBINE.

No. 865,160.      Specification of Letters Patent.      Patented Sept. 3, 1907.

Application filed January 29, 1907. Serial No. 354,699.

*To all whom it may concern:*

Be it known that I, JOSEPH KEALAKAIMANA CLARK, a citizen of the United States, and a resident of Honolulu, Territory of Hawaii, have invented a new and Improved Steam-Turbine, of which the following is a full, clear, and exact description.

This invention is an improvement in steam turbines, having for an object among others, the provision of a comparatively light but strong and durable engine, especially designed for automobile use.

The invention further contemplates a turbine which may be easily reversed or brought to a quick stop, and provide for the utilization of the exhaust steam to lubricate the transmission gear inclosed in a protective casing arranged at one side of the engine.

Reference is to be had to the accompanying drawings forming a part of this specification, in which similar characters of reference indicate corresponding parts in all the figures.

Figure 1:
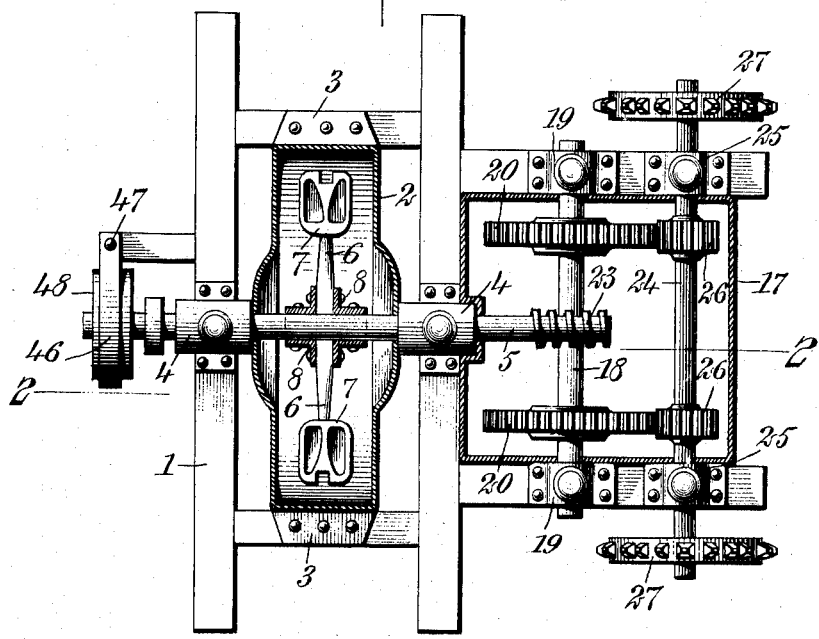
Figure 2:
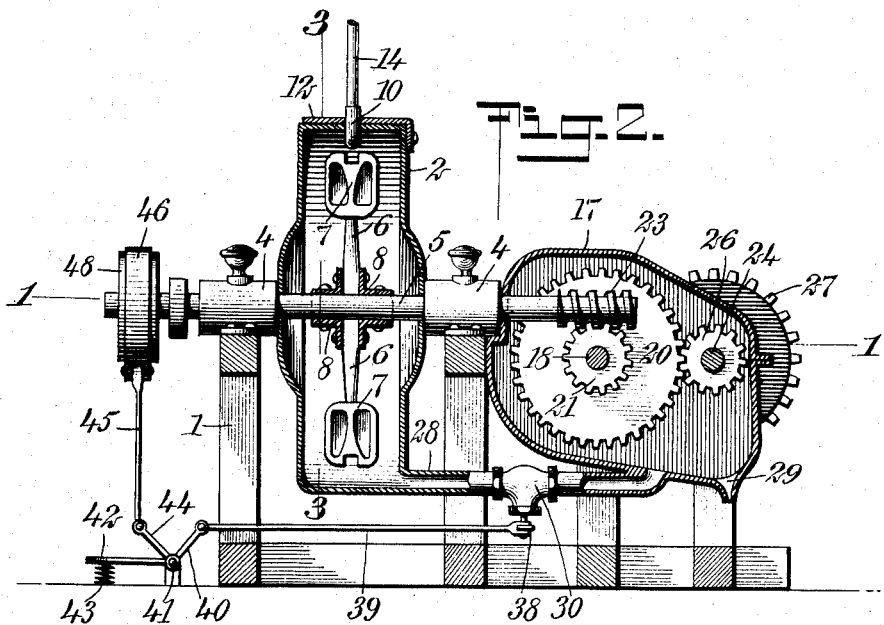

Figure 1 is a horizontal, sectional plan of the engine, substantially on the line 1—1 of Fig. 2; Fig. 2 is a vertical, sectional view substantially on the line 2—2 of Fig. 1; Fig. 3 is a cross section on the line 3—3 of Fig. 2; Fig. 4 is an enlarged front face view of one of the piston heads; Fig. 5 is a cross section on the line 5—5 of Fig. 4, and Fig. 6 is a central, longitudinal section through a valve forming a detail of construction.

In Figs. 1 and 2 I have shown my improved turbine supported on a frame-work 1, which may or may not be used, according to the use to which the engine may be put.

2 indicates the cylinder of the turbine, which consists of two semicircular casings secured together by flanges 3 provided at each end thereof, said flanges also affording means by which the cylinder may be rigidly fixed to the frame 1 or other suitable support.

In boxes 4 arranged at each side and at the center of the cylinder 2 is journaled a main or driving shaft 5 which passes through the cylinder. Secured to the shaft 5 within the cylinder 2 is a loosely-fitting piston comprising a series of radiating spokes 6, having formed as integral parts or otherwise attached, enlarged piston-heads 7. The connection between the shaft 5 and the spokes 6 is preferably formed by incasing the inner ends of the latter between flanged collars 8 and riveting them thereto, the collars being fixed to the shaft by set-screws or other well-known devices.

The shape of the piston-heads 7 are as best shown in Figs. 3 and 4, which disclose them with thickened lower ends tapered to substantially a point in passing to the circumference of the cylinder, and providing each of the heads with a front face of somewhat more extended surface than the rear face. On each face of the head 7 are provided oblong rounded recesses 9, separated by a central, vertical web 10, the latter acting to divide the steam jets at each side and give the steam a flow at each side of the heads to prevent possible impediment. For directing these jets are provided nozzles 10 and 11 entering the top of the cylinder through a reinforcing plate 12, and are positioned to act centrally on the front face of each head as the piston revolves. For driving the piston in the opposite direction a similar nozzle 13 located intermediate of the nozzles 10 and 11, directs a steam jet centrally on the rear and contracted faces of the piston-heads, this contraction affording greater power as the engine is driven forwardly. The nozzles 10, 11 and 13 are connected with any suitable source of steam supply, through vertical pipes 14 each provided with a controlling valve 15. The valves in the pipes leading to the nozzles 10 and 11 are connected by a controlling lever 16 operable to admit and cut off the steam passing to them simultaneously. A similar lever 16ª is connected to the remaining valve 15 and is likewise operable to cut off and admit steam to the nozzle 13.

At one end of the engine is supported a casing 17 inclosing a transmission gear, consisting of a cross-shaft 18 journaled in bearings 19 and having a gear 20 fixed near each end thereof within the casing and an intermediate worm-wheel 21 shown in Fig. 2, meshing with a worm 23 fixed to one end of the driving shaft 5. A second cross-shaft 24, arranged parallel to the shaft 18, is journaled in bearings 25 and is driven from the shaft 18 by the intermeshing of smaller gears 26 fixed thereto, with the large gears 20. A sprocket-wheel 27 is fixed to each end of the cross-shaft 24 for the purpose of driving the vehicle through suitable intermediary connecting chains.

The lower portion of the cylinder 2 is connected with the casing 17 by an exhaust pipe 28, which acts to lubricate the inclosed transmission gear and thereafter escapes at the bottom of the casing through a discharge opening 29. The exhaust pipe 28 is provided at a point intermediate its length with a valve 30, the construction of which is best illustrated in the sectional view of Fig. 6, which shows the same provided with a passage 31 passing therethrough, adapted to be closed by a screw-threaded plug 33, having a rubber or other soft pad 34 in the end thereof, adapting the same to make a steam-tight fit with the opposed side of the valve casing. Threaded into the lower side of the valve is a cap 35, connected with the plug 33 by a spiral spring 36, the latter surrounding a stem 37 rigidly connected to the plug and journaled in the cap. The spring 36 acts to revolve the plug 33 and unseat the pad 34, permitting the exhaust to freely pass to the gear casing. As shown in Fig. 6, the valve is closed and consequently the spring 36 is under tension and will act to unseat the plug and open the valve when a lever 38 fixed to the outer end of the stem 37 is released. This lever 38 is connected to a link 39, pivotally attached to one arm of a bell crank lever 40, pivotally mounted at 41, the opposite arm of said bell crank lever being formed into a foot treadle 42 normally forced upwardly by a spring 43 positioned thereunder. A third and intermediate arm 44 is rigidly attached to the bell crank lever 40 and is pivotally connected to a vertical link 45, the latter being connected to a flexible belt or brake 46 secured as at 47 to a fixed part of the frame and passing about a friction-wheel 48 fixed to this end of the driving shaft 5. It is apparent from this construction that on depressing the foot-treadle 42, the valve 30 will be closed, choking off the exhaust and simultaneously applying the brake to the friction-wheel 48, thereby bringing the engine to a sudden stop.

Having thus described my invention I claim as new and desire to secure by Letters Patent:

1. The combination of a steam turbine, transmission gearing driven by the turbine, a casing inclosing said gearing, and means connecting the exhaust of the turbine with the casing to lubricate the gearing by said exhaust.
2. A steam turbine having an exhaust pipe, a valve attached to the exhaust pipe, means adapted to automatically open said valve, and a foot lever operable to close the valve, for the purpose described.

3. A steam turbine comprising an exhaust pipe, a valve connected to the exhaust pipe, a brake, and means operable to simultaneously close the valve and apply the brake.

4. The combination of a steam turbine, comprising a driving shaft and an exhaust pipe, a valve connected to the exhaust pipe, a friction-wheel attached to the driving shaft, a brake passing over the friction-wheel, and means operable to simultaneously apply the brake to the wheel and close said valve.

5. A steam turbine comprising a driving shaft and an exhaust pipe, a valve connected to the exhaust pipe, a friction-wheel secured to the driving shaft, a belt passing over the friction-wheel, and a foot-treadle connected to both the valve and to the belt operable when depressed to close the valve and apply the belt to the friction-wheel, for the purpose described.

6. A steam turbine comprising a cylinder, a driving shaft passing through the cylinder and having a piston connected thereto, transmission gearing arranged at one side of the cylinder directly driven from said shaft, a casing inclosing said gearing, an exhaust pipe connecting the cylinder with the casing, a valve carried by the exhaust pipe, a brake carried by the driving shaft, and means operable to simultaneously close the valve and apply the brake.

7. A steam turbine comprising a piston composed of a series of radiating spokes, and a head secured to the outer end of each spoke, said head having an oblong rounded recess at each side thereof.

8. A steam turbine comprising a piston composed of a series of radiating spokes, each spoke having a head secured to the outer end thereof, said heads having recesses in both their front and rear faces.

9. A steam turbine comprising a cylinder, a piston loosely fitting and revolubly mounted in the cylinder, composed of a series of spokes having heads at the outer ends thereof, nozzles passing into the cylinder adapted to eject jets of steam against said heads to drive the piston in one direction, valves simultaneously operable to control the admission of the steam to said nozzles, a nozzle arranged intermediate and oppositely directed to said first nozzles adapted to direct a jet of steam against the opposite faces of the heads in driving the piston in the opposite direction, and a valve controlling the admission of the steam to said intermediate nozzle.

In testimony whereof I have signed my name to this specification in the presence of two subscribing witnesses.

JOSEPH KEALAKAIMANA CLARK.

Witnesses:
R. B. KIDD,
K. K. THOMAS.